United States Patent [19]

Kroffke

[11] 3,995,717

[45] Dec. 7, 1976

[54] SEQUENTIAL LUBRICATION DISTRIBUTOR AND LUBRICANT INJECTOR THEREFOR

[75] Inventor: Kenneth K. Kroffke, Broadview Heights, Ohio

[73] Assignee: Houdaille Industries, Inc., Buffalo, N.Y.

[22] Filed: Sept. 19, 1974

[21] Appl. No.: 507,401

[52] U.S. Cl. .................................................. 184/7 F

[51] Int. Cl.² .......................................... F16N 25/02

[58] Field of Search ........... 184/7 R, 7 D, 7 E, 7 F, 184/12, 61; 417/349, 339, 402

[56] References Cited

UNITED STATES PATENTS

| | | | |
|---|---|---|---|
| 2,269,928 | 1/1942 | Dirkes | 184/7 F |
| 3,024,869 | 3/1962 | Akamatsu | 184/7 F |
| 3,086,614 | 4/1963 | Sensui | 184/7 E |
| 3,459,278 | 8/1969 | Callahan | 184/7 E |
| 3,783,973 | 1/1974 | Kurten | 184/7 E |
| 3,809.502 | 5/1974 | Henry | 407/349 |

*Primary Examiner*—Richard C. Pinkham
*Assistant Examiner*—Marvin Siskind
*Attorney, Agent, or Firm*—Hill, Gross, Simpson, Van Santen, Steadman, Chiara & Simpson

[57] ABSTRACT

A lubricant distributor system including a plurality of piston cylinder lubricant injector units constructed and arranged so that the pistons thereof move in sequence from retracted positions to lubricant displacement positions to expel a given quantity of lubricant from each of the cylinders and then move in sequence from the lubricant displacement positions to the retracted positions, whereby each cylinder except the last is refilled with lubricant from an adjacent cylinder and only the first cylinder discharges lubricant back through a lubricant supply line upon completion of each lubricant cycle.

A lubricant injector adapted for sequential operation when used in multiples in a centralized lubrication system. The lubricant injector includes a piston mechanism which is movable, in response to pressure imposed by lubricant supplied from a pressurized source thereof, from a retracted position to a lubricant displacement position, whereby a given quantity of lubricant in the injector is displaced by the piston mechanism for delivery to a point of use. As the piston mechanism approaches its lubricant displacement position it communicates pressurized lubricant from the pressurized source to the next succeeding lubricant injector, whereby the injectors are hydraulically interlocked and actuated in sequence.

15 Claims, 5 Drawing Figures

SEQUENTIAL LUBRICATION DISTRIBUTOR AND LUBRICANT INJECTOR THEREFOR

BACKGROUND OF THE INVENTION

The present invention relates generally to the field of lubrication and more particularly to centralized lubrication systems for feeding lubricant in predetermined quantities to a plurality of points of use such as bearings and the like.

One well known centralized lubrication system, commonly referred to as a single-line system, involves one or more series feeders in each of which is formed a plurality of cylindrical bores arranged in side-by-side relation. A piston or plunger is reciprocally carried in each of the bores. A lubricant inlet is provided in each series feeder for connection to a single lubricant supply line which delivers lubricant under pressure from a suitable source such as a positive displacement pump. A plurality of lubricant outlets are provided in each series feeder for connection respectively to a point of utilization or to another series feeder. By virrtue of the virtue of the hydraulic circuitry within the series feeders, and the valving action caused by movement of the pistons, the pressurized lubricant being supplied to each of the series feeders has the effect of reciprocating the pistons thereof serially and in a predetermined sequence. As a consequence of this hydraulic circuitry the pistons are hydraulically interlocked and the operation of the feeders and the movement of each of the pistons is dependent upon the continued movement of each of the other pistons. Thus if any one of the pistons is prevented from moving through its full stroke, due to blockage of its respective lubricant discharge line, for example, the movement of all of the pistons is prevented.

Such feeders, a typical embodiment of which is shown in Harter U.S. Pat. No. 2,792,911, are employed in a variety of centralized lubrication systems, that is, systems which supply lubricant from a single source to a plurality of points of use. One of the principal advantages of series feeders lies in the ease with which the cyclic operation thereof can be monitored.

For example, since each piston in each feeder must move a full stroke before the next succeeding piston can move, a "fault" signal for the entire feeder (or for a number of feeders, if they are connected in series) can be obtained merely by monitoring the movement of a single piston. Thus the series feeder is particularly amenable to the utilization of a relatively simple and inexpensive central monitor system.

Another advantage in the use of series feeders involves the manner in which the pressurized lubricant is supplied to the feeder. Since the valving action of the pistons themselves produces cyclic operation, the pistons are moved back and forth in their respective bores even through only a single lubricant supply line connects the feeder to the lubricant pump. Were it not for such valving action of the pistons and attendant hydraulic circuitry, it would be necessary to connect the pump to the feeder by means of two lines, with the pressurization of the lines being alternated, in order to effect reciprocal movement of the pistons.

Another well known centralized lubrication system is commonly referred to as a lubricant injector system. A typical system includes a plurality of injectors each of which comprises a single piston which expels a predetermined quantity of lubricant to a single point of use. Known lubricant injectors are incapable of sequential operation and thus in a lubrication system which services a number of lubrication points, each of the injectors is connected "in parallel" with the lubrication pump. The piston or plunger mechanisms in the various injectors are spring biased to a return or retracted position, after they have been moved under pressure to a lubricant displacement position to displace and expel lubricant from their respective outlets to points of utilization. Each of the injectors returns lubricant back through the lubricant supply line as its piston moves back to its retracted position, and this accumulation of lubricant which must be forced back through the supply line upon the completion of each lubrication cycle generally precludes the use of grease and other heavy lubricants in a lubricant injector system.

Since prior art lubricant injectors generally are not sequentially operable nor hydraulically interlocked they are actuated by lubricant supply pressure in a random pattern rather than in sequence, with the injector which is subjected to the lowest resistance or back pressure being activated first, then the injector subjected to the next lowest back pressure and so forth. Since the movement of each piston is independent of the movement of each of the other pistons, a simple central monitor system, detecting movement of only a single piston, cannot be used to monitor the movement of all the pistons. Instead a separate monitor system is required for each of the various lubricant injectors in a given system, if the operation of the entire system is to be monitored.

Furthermore, as a result of the significant amount of lubricant which must be forced back into the lubricant supply line at the conclusion of each lubrication cycle, central systems using lubricant injectors have been generally limited to the use of light oils, as cotrasted with grease and other heavy lubricants.

There is, however, at least one important advantage of lubrication system which employs lubricant injectors as opposed to series feeders. In an injector system, the number of injectors can be easily increased merely by connecting additional injectors to the main lubricant supply line. It is not necessary to disconnect and repipe any of the other injectors. In a system which utilizes series feeders, however, it is generally necessary to disassemble and reassemble at least portions of the feeder, or to add certain manifolding apparatus, to accommodate additional lubricant points of use.

The present invention involves the development of an improved centralized lubrication system as well as a lubricant injector which can be hydraulically interlocked and thus actutated in sequence when used in multiples to lubricate plurality of lubrication points. Further, more, only a relatively minor quantity of lubricant must be forced back through the lubricant supply line at the conclusion of each lubrication cycle. Thus, a centralized lubrication system employing my new injector would enjoy the advantages of a system using series feeders (hydraulic interlock, sequential operation and use of grease and other heavy lubricants) as well as the advantages of a system utilizing injectors (easy of "adding on"). In addition, and particularly in respect of the preferred embodiment of my invention, the manufacturing cost of injectors can be substantially reduced, thereby enabling centralized lubrication systems to be employed in a variety of applications which hitherto could not economically justify the use of central systems.

SUMMARY OF THE INVENTION

Briefly, the present invention comprises a centralized lubrication system employing a plurality of lubricant injectors each having an injector body or housing means, a cylindrical bore formed in the body and having an inlet end and an outlet end, an inlet port, an outlet port and a two-way transfer port formed in the body with the inlet port communicating with the inlet end of the bore, the outlet port communicating with the outlet end of the bore and the two-way transfer port communicating with the bore between the inlet and outlet ends thereof and a piston mechanism or assembly reciprocally carried within the bore and movable from a retracted position adjacent the inlet end of the bore to a lubricant displacement position adjacent the outlet end of the bore, the arrangement being such that communication between the inlet port and the two-way transfer port through the cylindrical bore is blocked by the piston assembly in the retracted position thereof and fluid communication between the inlet port and the two-way transfer port is established through the cylindrical bore when the piston assembly is in the lubricant displacement position thereof. A biasing member such as a coil spring or the like biases the piston assembly from the lubricant displacement position back to the retracted position thereof.

By virtue of the foregoing construction and arrangement a system may employ any number of injector units which are interconnected and hydraulically interlocked for sequential operation. Only the inlet port of the first injector unit is connected directly to the lubricant pump. The inlet port of each succeeding injector is connected to the two-way transfer port of the next preceding injector. None of the injectors will operate to displace lubricant to its respective point of use until the piston assembly in the next preceding injector has been fully actuted and has discharged or metered its full quantity of lubricant. Thus not only do the injectors operate in sequence rather than in a random pattern, but because of the hydraulic interlock the movement of only a single piston can be sensed to monitor the operation of the entire system.

In one embodiment of the present invention the piston mechanism or assembly comprises a pair of pistons as commonly found in injectors of the prior art. In the preferred embodiment, however, the piston mechanism comprises only a single piston, travelling in a bore of constant diameter throughout the length of travel of the piston. This arrangement appreciably reduces the manufacturing costs and also, by virtue of its simplicity, reduces operational and maintenance problems. In addition, the bores of the injector units are refilled or charged with lubricant from the bores of adjcent units or from a fluid expansion chamber whereby only a very small amount of lubricant, equal to the displacement of only one of the pistons of one of the injector units, is returned to the lubricant pump or reservoir, upon completion of each lubrication cycle. This latter feature, described in detail hereinafter, enables a lubrication system constructed in accordance with the present invention to be used with grease or other heavy (highly viscous) lubricant, a feature which lubrication systems employing prior art lubricant injectors are incapable due to the necessity of exhausting all of the lubricant injectors upon the completion of each lubrication cycle.

In light of the foregoing, it is an object of the present invention to provide a centralized lubrication system employing multiple lubricant injectors to provide a hydraulically interlocked sequentially operable one-line lubrication system.

Another object of the invention is to reduce the manufacturing costs of centralized lubrication systems.

Another object of the invention is to provide a centralized lubrication system utilizing multiple lubricant injector units in which the operation of the entire system can be monitored by sensing the movement of only one of the pistons of the entire system.

Another object of the invention is to enable hydraulically interlocked sequentially operable centralized lubrication systems to accommodate increased points of utilization without significant disruption of lubricant piping.

Another object of the invention is to provide an improved single line sequentially operable lubrication system which comprises a plurality of lubricant injectors each of which has formed therewithin a cylindrical bore of constant diameter and each of which employs within such bore a unitary piston structure.

Another object of the invention is to provide a lubrication system employing multiple lubricant injector units in which the bores of the various units are recharged by lubricant from the bore of an adjacent unit or from an associated fluid expansion chamber.

Another object is to provide a lubricant injector lubrication system in which the lubricant from only one injector is forced back through the supply line upon completion of a lubrication cycle.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

DESCRIPTION OF THE PREFERRED EMBODIMENTS

Figure 1:
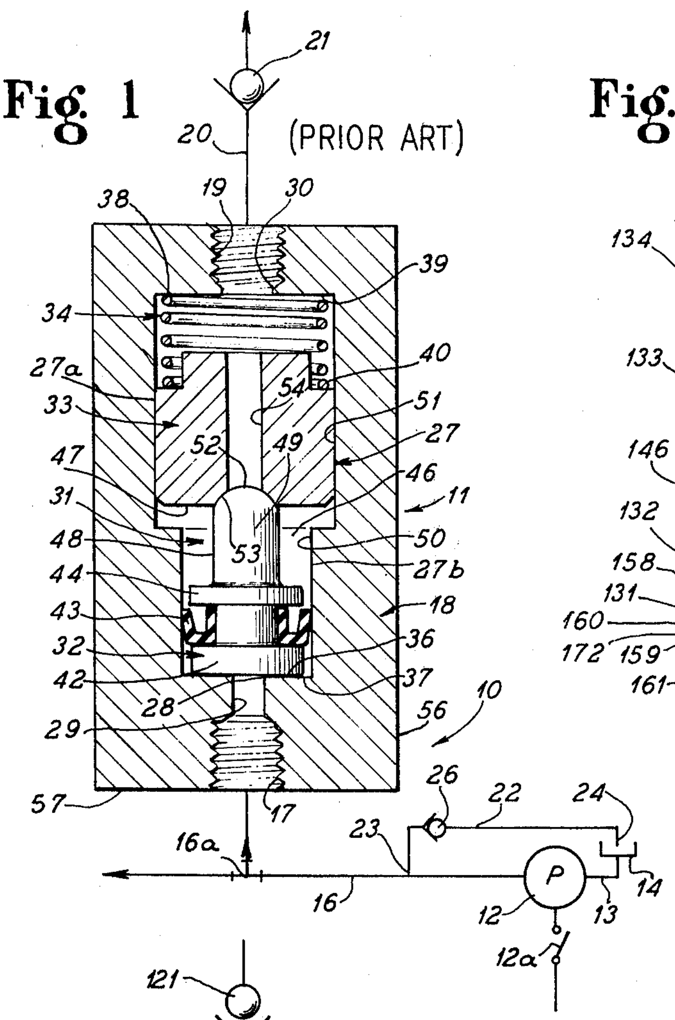
FIG. 1 is a sectional view of a typical prior art lubricant injector with attendant hydraulic circuitry shown schematically.

FIG. 1, as the denomination thereon suggests, illustrates a typical prior art lubrication system indicated generally at reference numeral 10, employing a series of lubricant injectors, one of which is shown at reference numeral 11.

The system 10 further includes a pump 12, the suction side of which is connected to a pipe 13 which in turn is connected to a lubricant reservor 14 containing a supply of light lubricant such as oil. The pump 12 may be selectively actuated by means of a switch mechanism 12*a*.

The discharge side of the pump 12 is connected to one end of a supply conduit 16, which is teed at 16*a* to connect to a threaded conduit connection 17 formed in a body portion 18 of the lubricant injector 11. As noted, the conduit 16 may continue on to supply lubricant to a number of other lubricant injectors, all of which are connected in parallel to the supply pump 12.

At an opposite end of the injector body 18 is another threaded conduit connection 19 to which is connected a discharge conduit 20 having a ball-type check valve 21 mounted therein. The conduit 20 leads to a bearing or similar point of utilization of the lubricant being metered by the lubricant injector 11.

A bypass line 22 is indicated as being connected at one end 23 to the lubricant supply line 16 and communicating at an opposite end 24 with the reservoir 14. A check valve 26 is mounted in the bypass line 22.

Preferably the lubricant pump 12 is of the positive displacement type and includes a reciprocable piston which is movable forward in its associated cylinder to force lubricant through the supply line 16 and then movable backWard to draw a further supply of lubricant into the cylinder. In most commercial embodiments of the pump 12, the bypass line 22 and the check valve 26 are actually located within the pump casing, and the end 23 of the bypass line 22 opens into the cylinder wall of the pump and is blocked by the piston to prevent bypass to the reservoir 14 as the piston moves in its forward stroke but is unblocked to permit bypass after the piston has been retracted.

Also formed within the injector body 18 is a cylindrical bore 27, defined in part by a cylindrical wall 27*a* which has a relatively large diameter and in part by a cylindrical wall 27*b* which has a relatively small diameter. An inlet port 28 is formed at one end of a passage 29 which communicates with the threaded conduit connection 17 and opens to the reduced diameter portion 27*b* of the bore 27, whereas an outlet port 30 opens directly to the enlarged diameter portion 27*a*.

A piston assembly 31 is located in the cylindrical bore 27 and comprises a power piston 32, a lubricant displacement piston 33 and a coil spring 34. The power piston 32 comprises an end wall 36 which, in the retracted position thereof shown in FIG. 1, is bottomed on a facing end wall 37 of the cylindrical bore 27. At the other end of the bore 27, one end 38 of the spring 34 is bottomed on a bore end wall 39, the opposite end of 40 of the spring 34 bottoming on an end wall 41 of the lubricant displacement piston 33.

In operation, the pump 12 is energized by closing the switch 12a to move the pump piston forward to supply lubricant under pressure through the supply line 16, thence through the threaded connection 17 and the passage 29, to the inlet port 28 of the lubricant injector 11 and to any additional injectors connected in parallel to the pump 12. The pressurized lubricant moves into the reduced diameter portion 27*a* of the cylindrical bore 27 and around a lower land 42 of the power piston 32. The lubricant then flows upwardly past a uni-directional seal 43 which is disposed between the lower land 42 and an upper land 44 of the power piston 32.

The line pressure of the lubricant is thereby imposed in a make-up chamber 46 located within the bore 27 and defined in part by a lower wall 47 of the lubricant displacement piston 33 and a cylindrical wall 48 of a protuberance or rod 49 extending axially from the upper land 44 of the power piston 32. The make-up chamber 46 is further defined by a cylindrical wall 50 of the reduced diameter bore portion 27*b* and a cylindrical wall 51 of the increased diameter bore portion 27*a*.

Pressurization of the make-up chamber 46 has the effect of moving the power piston 32 and the lubricant displacement piston 33 in the direction of the outlet port 30 against the bias of the spring 34, thereby forcing lubricant out through the outlet port 30 and into the discharge line 20. As this movement of the pistons 32 and 33 continues, an arcuately shaped nose portion 52 of the rod 49 is maintained in abutting engagement with a seat 53 formed on the lubricant displacement piston 33 in surrounding relation to an axial passage 54.

After the power piston 32 and the lubricant displacement piston have moved a full stroke in the direction of the outlet port 30 to their respective limiting or lubricant displacement positions, the pump 12 is de-energized and the piston thereof moved backwardly, thus reducing or eliminating the pressure in the lubricant supply line 16. As a consequence of this reduction in pressure, the seal 43 closes to prevent the flow of lubricant downward therepast, while the biasing member or spring 34 urges the lubricant displacement 33 and thus the power piston 32 downward in the direction of the inlet port 28.

As a result of this movement, the seat 53 of the lubricant displacement portion 33 is lifted slightly off the nose portion 52 of the rod 49, thereby permitting lubricant to flow from the make-up chamber 46 through the axial passage 54, which extends through the lubricant displacement piston 33, and into the enlarged portion 27a of the cylindrical bore 27 above the lubricant displacement piston 33. By virtue of this flow of a portion of the lubricant from the make-up chamber 46 through and then into that portion of the bore 27 above the lubricant displacement piston 33, both pistons 32 and 33 are urged downwardly until the bottom wall 36 of the power piston 32 again abuts the end wall 37 of the cylindrical bore 27. The spring 34 then urges the seat 53 of the lubricant displacement piston 34 again into abutting engagement with the nose 52 of the power piston 32, and both pistons 32 and 33 are again in the retracted positions thereof, ready for another cycle of the lubricant pump 12.

As the piston of the pump 12 moves forward through its full stroke it supplies more lubricant through the supply line 16 into the cylindrical bore 27 of the injector 11 than is discharged to the bearing or the like through the discharge line 20. As a consequence, after the pressure in the supply line 16 is relieved and the pistons 32 and 33 move downward to the retracted positions thereof, a quantity of lubricant is forced back through the supply line 16 and the bypass line 22 to the reservoir 24.

It will be appreciated that any given number of lubricant injectors 11 can be connected to the supply line 16. All such injectors will be actuated independently of one another and in no special sequence save that which may be imposed by virtue of the differences in back pressure to which the lubricant injectors are subjected. Thus not only is the sequence of operation unpredictable, but any of the injectors can become operative without disrupting the operation of any of the other injectors.

Thus to adequately monitor the operation of the system 10 it is necessary to use as many sensing devices as there are lubricant injectors 11. The injectors cannot be hydraulically interlocked, do not operate continuously in a given sequence and cannot be monitored by means of a single sensing device. In addition a relatively large quantity of lubricant is forced back through the supply line 16 upon completion of each lubrication cycle, the total amount being equal to the amount returned from each injector times the number of injectors in the system.

Figure 2:
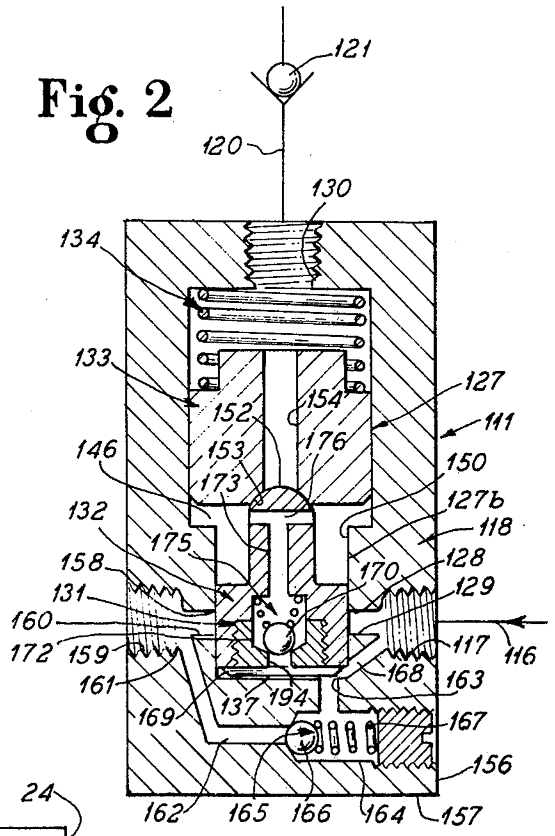
FIG. 2 is a sectional view of a lubricant injector constructed in accordance with the principles of the present invention.

FIG. 2 illustrates one embodiment of an improved lubricant injector constructed in accordance with the principles of the present invention. The injector is indicated at reference numeral 111 and parts thereof which correspond structurally or functionally to those shown in FIG. 1 are generally designated by corresponding reference numerals increased by the number 100.

Thus the lubricant injector 111 includes a threaded conduit connection 117 for receiving a lubricant supply line 116. In the embodiment shown in FIG. 2 the connection 117 enters the injector body 118 through a side wall 156 rather than through a bottom wall 157. Furthermore the inlet port 128 communicates with the bore 127 through the cylindrical wall 150 of the reduced diameter portion **127*b*.**

In addition to the inlet port 128 and the outlet port 130, another port 158 is formed in the injector body 118 and opens into the reduced diameter portion **127*b* of the bore 127 through the cylinder wall 150. The port 158 may be conveniently referred to as a two-way transfer port, since lubricant flows therethrough in opposite directions during various phases of operation of the lubricant injector 111.**

Port 158 communicates with a threaded conduit connection 159 through a passage 160, which passage also communicates with one end 161 of a bypass passage 162, the opposite end 163 of which opens into the bottom wall 137 of the bore 127. Located in an enlarged portion 164 of the bypass line 162 is a check valve assembly 165 including a ball check 166 and a spring biasing member 167. As shown, the ball check 166 is normally biased to a closed position.

The end 163 of the bypass line 162 is in constant open communication with another internal passageway 168 formed in the injector body 118 and communicating with the threaded connection 117. As shown, the lower end of the power piston 132 is slightly chamfered as indicated at reference numeral 169 to ensure open communication between the end 163 of the bypass line 162 and the internal passage 168.

In the embodiment shown in FIG. 2 the uni-directional seal 43 of FIG. 1 is replaced by a check valve assembly 175 which includes a ball check 170 and a biasing member 171. The assembly 175 is housed within an enlarged portion 172 of a passage 173 which extends axially through the power piston 132 from a port 174 at the lower end thereof to a transverse passage 176 at the upper end thereof, whereby the make-up chamber 146 communicates with the passage 168 through the power piston 132.

In operation, pressurization of the lubricant supply line 116 effectively pressurizes passage 168 which in turn lifts the ball check 170 from its seat to permit pressurization of the passages 173 and 176, and ultimately the make-up chamber 146.

Pressurization of the make up chamber 146 along with pressurization of that portion of the bore 127 below the power piston 132 has the effect of moving the entire piston assembly 131 upwardly in the bore 127, as the lubricant injector 111 is viewed in FIG. 2.

Figure 3:
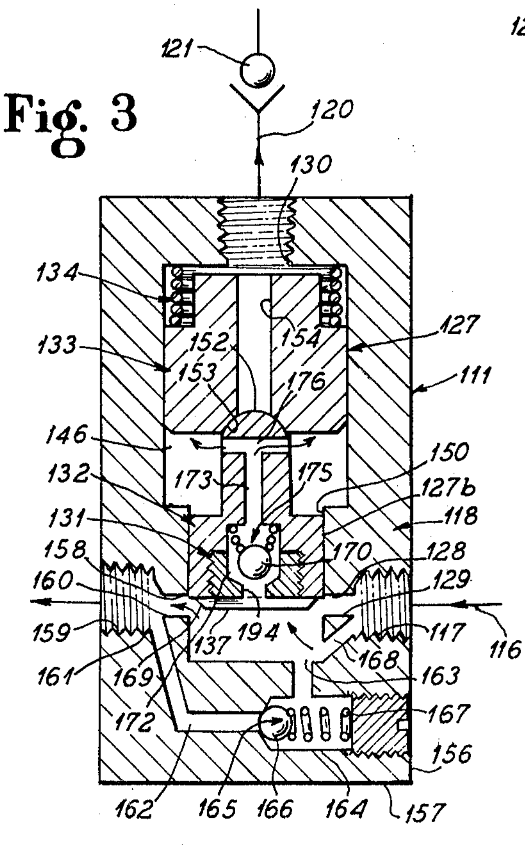
FIGS. 3 and 4 are similar to FIG. 2 but disclose certain parts of the lubricant injector in the positions thereof which obtain during different phases of the operation of the injector.

FIG. 3 discloses the relative disposition of parts after the piston assembly 131 has moved upward through its full stroke to the lubricant displacement position thereof. As it moves upwardly, the nose 152 of the power piston 132 is maintained in abutting engagement with the seat 153 which surrounds the axial passage 154 foRmed in the lubricant displacement piston 133, thereby precluding the flow of lubricant upwardly through the passage 154. Thus the lubricant above the piston 133 is forced through the outlet bore 130 and into the lubricant discharge line 120 leading to the bearing or similar lubrication point connected thereto.

After the piston assembly 132 has travelled through its full stroke to the position thereof shown in FIG. 3, the passage 129 as well as the passage 168, which communicate with the lubricant supply conduit 116, are in open communication with the two-way transfer port 158, which is adapted for connection to the inlet port 117 of the next succeeding lubricant injector 111. Thus, after the injector 111 has fully discharged a supply of lubricant through the discharge line 120 and the power piston 132 has "cleared" the two-way transfer port 158, the pressurized lubricant from the supply conduit 116 is conducted to the next succeeding injector and actuates the same in the manner described above.

After all of the lubricant injectors in the system have been actuated and the lubricant pump deenergized the pressure in the lubricant supply line 116 is relieved. The spring 134 then biases the piston assembly 131 downwardly in the bore 127 to the initial or retracted position thereof shown in FIG. 2.

Figure 4:
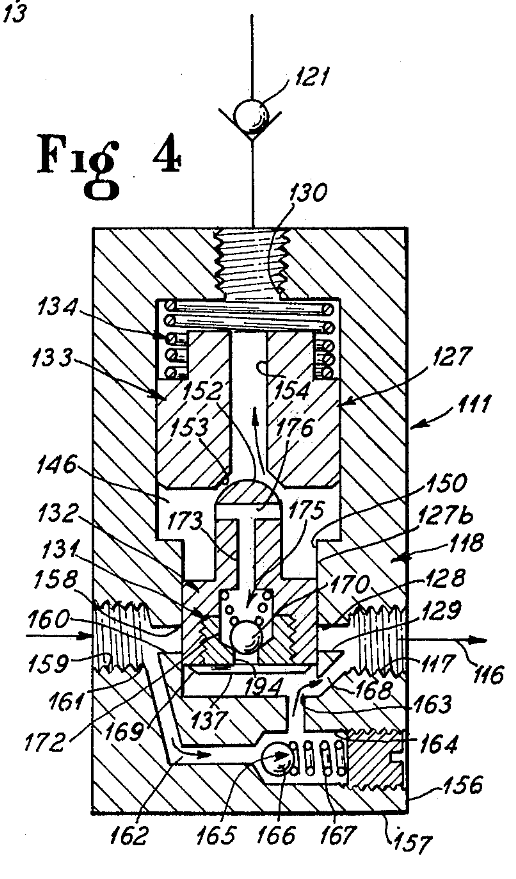

As the piston assembly 131 moves downwardly, as shown in FIG. 4, a vacuum condition is established in the bore 127 above the lubricant displacement piston 133 by virtue of the closing of the check valve 121, which vacuum condition has the effect of causing momentary unseating of the nose 152 of the power piston 132, thereby enabling lubricant from the make-up chamber 146 to flow through the passage 154 of the piston 133 to fill that portion of the bore 127 above the piston 133.

Any additional lubricant required to fill the expanding chamber formed above the piston 133 may flow through the check valve 175 located in the power piston 132 and into the make-up chamber 146. On the other hand, in the embodiment illustrated in FIGS. 2–4, the reduction in the volume of the make-up chamber 146 and in the bore 127 below the power piston 132 is greater than the increase in volume of the bore 127 above the lubricant displacement piston 133, and the excess lubricant is forced backward through the lubricant supply line 16 and the internal bypass line 22 located in the pump 12 to the lubricant reservoir 14, along with the excess lubricant being returned from all of the succeeding injectors, as indicated by the arrowhead flow lines in FIG. 4.

It will therefore be appreciated that a plurality of lubricant injectors 11 can be interconnected to provide a central lubrication system servicing a number of lubrication points. The inlet port 117 of the first lubricant injector 111 is connected to the lubricant pump, whereas the inlet ports 117 of the succeeding injectors are connected to the two-way transfer ports 158 of their respective preceding injectors 111. Thus the second injector can be activated only after the first injector has fully discharged its metered quantity of lubricant and the third injector is activated only after the second injector has fully discharged its supply of lubricant. The activation of the injectors 111 is thus in sequence and since the injectors are hydraulically interlocked, the operation of the entire system can be monitored merely by sensing the movement of the piston assembly 131 of any of the injectors 111 in the system. On the other hand, the embodiment of the invention shown in FIGS. 2–4 still fails to overcome one important disadvantage inherent in the use of known lubricant injectors, namely, the return of a substantial quantity of lubricant back through the supply conduit 116 upon the completion of a lubrication cycle. The total amount of return lubricant depends upon the total number of injectors involved in any given system, but generally the quantity is sufficient to require a substantial pressure to return the lubricant through the supply conduit 116 in a reasonable period of time. Thus it is not envisioned that the improved lubricant injector 111 disclosed in FIGS. 2–4 will have wide usage in lubrication systems in which grease any heavy oils are used as the lubricant.

Figure 5:
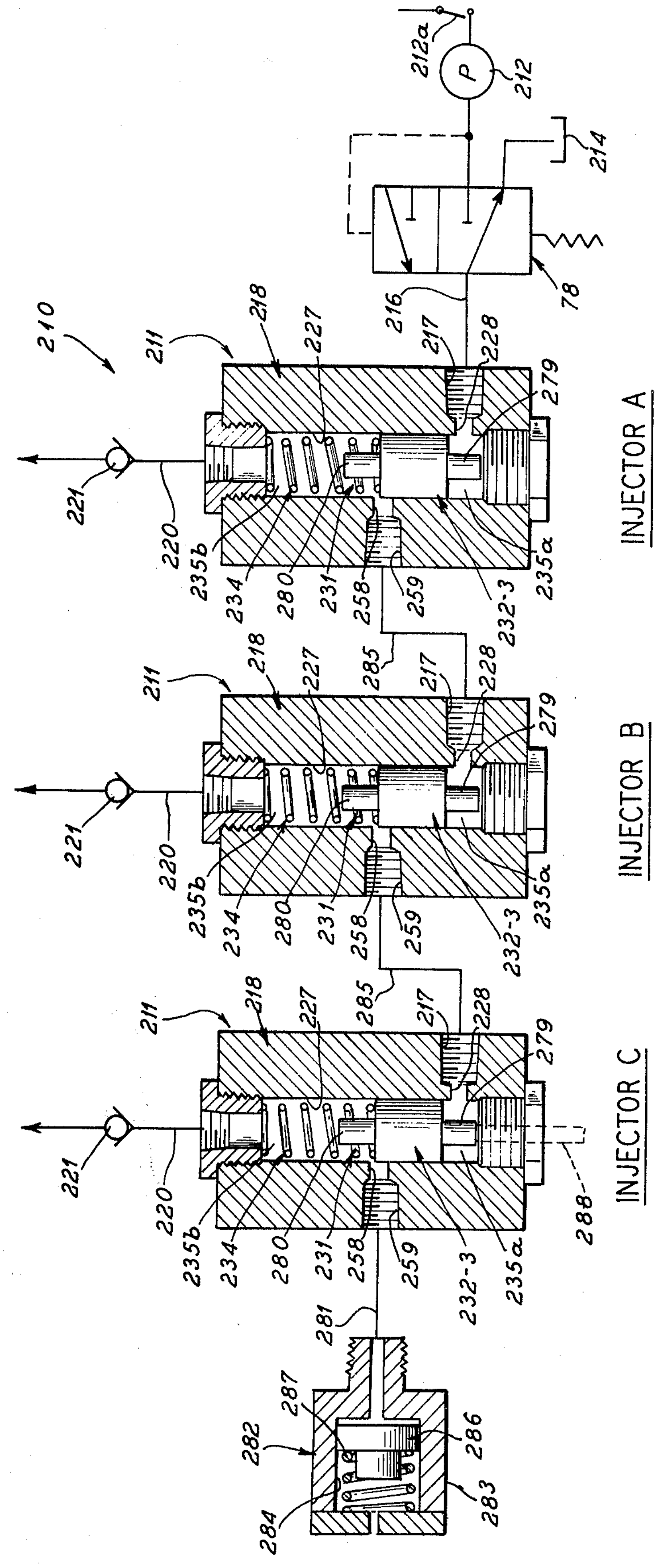
FIG. 5 discloses the preferred embodiment of any invention and includes a centralized lubrication system utilizing multiple lubricant injector units, with portions of the system being shown schematically.

FIG. 5 illustrates another and the preferred embodiment of the present invention. For convenience, parts which correspond generally to those shown in the preceding figures are indicated by means of similar reference numerals in the 200 series.

For illustrative purposes, three lubricant injectors 211 are shown in connected relation as part of a central lubrication system 210, although it will be appreciated that the invention comprehends any number of injectors. Each of the injectors 211 includes an injector body 218 in which is formed a cylindrical bore 227. A piston mechanism 231 is located in the bore 227 but in the embodiment shown in FIG. 5 the piston mechanism involves only a single unitary structure 232-3, which performs the same functions as are performed by the two-piston assembly shown in FIGS. 2–4.

An inlet port 228 opens to that portion of the bore 227 below the piston 232-3 which for convenience shall be referred to as a pressure chamber 235*a*, and communicates with the threaded conduit connection 217, which receives one end of a lubricant supply line 216, the other end of which communicates with a spring-biased pressure responsive two-way valve 78. A positive displacement lubricant pump 212 also connects to the valve structure 78 and as will be understood by those skilled in the art, the valve structure 78 is adapted to move in response to pressurization to connect the lubricant line 216 to the pump 212, and to depressurization to communicate the line 216 with the lubricant reservoir 214.

Spacer studs 279 and 280 extend axially from the oppositely facing motive surfaces of the piston 232-3 to limit or determine the length of travel of the piston 232-3. Thus in the retracted positions of the pistons 232-3, as shown in FIG. 5, the pressure chambers 235*a* are in constant communication with their corresponding inlet ports 228.

In operation, activation of the pump 212 serves to pressurize the pressure chamber 235*a* of the first injector 211, to which it is directly connected, such injector being designated as Injector A in FIG. 5, with the other two injectors being designated Injectors B and C, respectively.

The piston 232-3 of Injector A is thereupon urged upward against the bias of the spring 234, whereby the lubricant located in that portion of the bore 227 above the piston 232-3, referred to as a discharge chamber 235*b*, is forced out through the lubricant discharge line 220.

After the piston or plunger 232-3 of Injector A has moved upward through its full stroke, its corresponding two-way transfer port 258 is placed in open communication with the inlet port 228 and lubricant is thereby delivered through a transfer line 285 to the threaded conduit connection 217 of Injector B. The piston 232-3 of Injector B is thereby force upward to its lubricant displacement position, discharging lubricant from the discharge chamber 235*b*, after which the threaded conduit connection 217 and the inlet port 228 of Injector C are placed in communication with the two-way transfer valve 258 of Injector B. The piston 232-3 of Injector C is thereby activated to discharge its metered amount of lubricant from its discharge chamber 235*b*.

After the piston 232-3 of Injector C has moved to its lubricant displacement position (its fully upward position as viewed in FIG. 5) the two-way transfer port 258 thereof communicates through a conduit 281 to a lubricant expansion chamber indicated generally at reference 282. The expansion chamber 282 comprises a housing 283 in which is formed an axial bore 284 which carries a reciprocally movable expansion chamber wall 286 which is biased rightwardly as shown in FIG. 5 by means of a coil spring 287. Thus, after Injector C has been fully activated, additional pressurized lubricant enters the expansion chamber 282 to move the chamber wall 286 leftward, as viewed in FIG. 5.

After the Injectors A, B and C have all been fully activated, the pump 212 is deenergized by any suitable means, such as a pressure responsive switch 212*a* or the like. The spring 234 of each of the Injectors A, B and C bias their respecitve pistons 232-3 downward toward the retracted positions thereof. As the piston 232-3 of Injector A moves slightly downward, however, it closes its corresponding two-way transfer port 258, thereby preventing back flow from Injectors B and C and precluding the downward movement of the pistons 232-3 of those injectors.

The piston 232-3 of Injector A may continue its downward movement, however, since the lubricant trapped below the piston 232-3 is forced backwards through the line 216 and the valve structure 78 to the reservoir 214. As the piston 232-3 of Injector A moves downward it creates a vacuum in the discharge chamber 235*b*, but the force of spring 234 is sufficient to overcome the vacuum and move the piston 232-3 down to the fully retracted position thereof as shown in FIG. 5.

After the piston 232-3 of injector A has returned completely to its retracted position it unblocks its corresponding two-way transfer port 258, thereby communicating the discharge chamber 235*b* of Injector A with the pressure chamber 235*a* of Injector B. Thus the piston 232-3 of Injector B is hydraulically unlocked and moves downward to its retracted position with the lubricant displaced by such movement being transferred via line 280 to the discharge chamber 235*b* of Injector A.

After the piston 232-3 of Injector B has returned to its fully retracted position, as shown in FIG. 5, its corresponding discharge chamber 235*b* is in open communication with pressure chamber 235*a* of Injector C, and thus the piston 232-3 of Injector C becomes hydraulically unlocked and can thereby move to its retracted position. After it has done so, discharge chamber 235*b* thereof is in open communication with line 281 with the lubricant expansion chamber 282 and the lubricant stored in the chamber 282 is discharged into the discharge chamber **235*b*** of Injector C.

After the pistons 232-3 of all Injectors A, B and C have moved back to the retracted positions thereof the system 210 is ready for another lubrication cycle, and the same sequence of operation will commence upon energization of the pump 212. It is noted that, with the exception of Injector A, none of the injectors return lubricant to the supply line 216 as the pistons thereof return to their retracted position, thus only a relative insubstantial quantity of liquid is returned per lubrication cycle, and only a relatively slight pressure is required to accomplish this return in a reasonable period of time.

In the circumstances the embodiment shown in FIG. 5 can be successfully and advantageously utilized in systems in which grease and very heavy oils are used as lubricants. This capability permits lubricant injector systems to enjoy a whole new field of application, heretofore reserved for other more costly and complicated lubrication systems.

It will be appreciated, therefore, that the injectors 211 shown in FIG. 5 provide, when interconnected as shown, a centralized lubrication system which is hydraulically interlocked and which operates in sequence. Thus the entire system 210 may be monitored merely by sensing the movement of any of the pistons 232-3 such as, for example, by means of a slidable indicator rod 288 as shown in dotted lines in FIG. 5 extending through the injector body 218 and into the bore 227 of Injector C.

Not only the central lubrication system 210 be monitored in a relatively simple manner merely by sensing the movement of one of the pistons 232-3, but in addition the injectors 211 are highly simple in design and construction, thereby reducing manufacturing costs. Each of the pistons 232-3 consists of a unitary structure, as contrasted with the two-piston assembly shown in the preceding figures. In addition, the bore 227 is of constant diameter which appreciably reduces the machining costs in the formation of the bore. As a result of the nominal quality of lubricant returned through the supply line at the conclusion of each lubrication cycle, the system 210 finds particular utility in situations involving heavy lubricants such as grease.

Thus I have disclosed improved lubricant injectors which are susceptible of sequential operation when combined in a central lubrication system and connected to provide a hydraulic interlock. Such systems enjoy the advantages of systems which employ series feeders, that is, sequential operation and simplification of monitoring systems. Further, the improved lubricant injectors retain the advantages of prior art injectors, since additional lubrication points can be accommodated with a minimum disruption of lubricant piping. In combining these advantages in reducing overall costs, and in enabling lubricant injectors to be used in significant numbers in systems which distribute heavy lubricants, my invention will permit utilization of centralized lubrication systems in applications which prior hereto could not be economically justified.

Although minor modifications might be suggested by those versed in the art, it should be understood that I wish to embody within the scope of the patent warranted hereon all such modificatons which come within the scope of my contribution to the art.

What I claim is:

1. A cyclical centralized lubrication system comprising intermittently operable lubricant pump means and lubricant distributor means connected to said pump means, said lubricant distributor means comprising a plurality of lubricant injector units hydraulically interconnected for sequential operation, each of said lubricant injector units comprising a spring-biased piston movable from a retracted position to a lubricant displacement position and back to a retracted position during each lubrication cycle of said system, said lubrication distributor system being constructed and arranged such that lubricant from only one of said units returns to said pump means upon completion of a lubrication cycle.

2. The invention as defined in claim 1 in which at least one of said lubricant injector units is refilled with lubricant supplied from an adjcent lubricant injector unit.

3. A cyclical centralized lubrication system comprising intermittently operable lubricant pump means and lubricant distributor means connected to said pump means, said lubricant distributor means comprising a plurality of lubricant injector units hydraulically interconnected for sequential operation and constructed and arranged such that lubricant from only one of said units returns to said pump means upon completion of a lubrication cycle, each of said injector units comprising a cylinder and a piston mechanism in said cylinder dividing said cylinder into a pressure chamber and a discharge chamber, said piston mechanism being movable between a retracted position and a lubrication displacement position with the volume of said pressure chamber when said piston mechanism is in the lubrication displacement position thereof being equal to the volume of said discharge chamber when said piston mechanism is in the retracted position thereof.

4. A lubricant distributor system comprising system comprising housing means, a plurality of cylinders including a first cylinder and a last cylinder arranged in side-by-side relation in said housing means, a piston in each of said cylinders for dividing same into a pressure chamber and a discharge chamber, means associated with each of said cylinders forming an inlet port communicating with its respective pressure chamber, an outlet port communicating with its respective discharge chamber and a two-way transfer port communicating with its respective cylinder between its corresponding inlet and outlet ports, each of said pistons being movable from a retracted position, at which fluid communication between its respective inlet port and two-way transfer part is blocked and its respective pressure chamber is smaller than its discharge chamber, to a lubrication displacement position, at which fluid communication between its respective inlet port and two-way transfer port is established and its respective pressure chamber is larger than its discharge chamber, means biasing each of said pistons toward the retracted position thereof, a selectively actuable lubricant supply pump and means forming a fluid expansion chamber, the inlet port of said first cylinder being connected to said lubricant supply pump, the two-way transfer port of said last cylinder being connected to said fluid expansion chamber and the two-way transfer port of said first cylinder and any cylinders between said first and said last cylinders being connected to the inlet port of its adjacent cylinder.

5. The lubricant distributor system as defined in claim 4 wherein the discharge chamber of each of said cylinders except said last cylinder is filled by lubricant from the pressure chamber of its adjacent cylinder as its respective piston moves from its lubrication displacement position to its retracted position.

6. The lubricant distributor system as defined in claim 5 in which the discharge chamber of said last cylinder is filled by lubricant from said fluid expansion chamber as its respective piston moves from its lubrication displacement position to its retracted position.

7. The lubricant distributor system as defined in claim 4 wherein the lubricant from the pressure chambers of each of said cylinders except said first cylinder is supplied to the discharge chamber of the adjacent cylinder as its respective piston moves from its lubrication displacement position to its retracted position.

8. The lubricant distributor system as defined in claim 7 wherein the lubricant from the pressure chamber of said first cylinder is discharged back through its respective inlet port as its respective piston moves from its lubrication displacement position to its retracted position.

9. The lubricant distributor system as defined in claim 4 wherein said cylinders, said supply pump and said fluid expansion chamber are hydraulically interconnected and arranged so that said pistons of said first cylinder through said last cylinder move in sequence from their retracted positions to their lubrication displacement positions upon activation of said supply pump and return in sequence to their retracted positions upon de-activation of said supply pump.

10. The lubricant distributor system as defined in claim 4 wherein said housing means comprises a plurality of individual lubricant injector units each of which includes one of said cylinders and one of said pistons.

11. The lubricant distributor system as defined in claim 4 wherein the volume of said pressure chambers, when their respective pistons are in the lubrication displacement positions thereof, is equal to the volume of said discharge chambers, when their respective pistons are in the retracted positions thereof.

12. The lubricant distributor system as defined in claim 4 wherein said housing means comprises individual spring members disposed respectively in said discharge chambers of said cylinders.

13. A sequentially operable lubricant distributor system including a plurality of adjacent interconnected injector units including a first unit and a last unit with each unit comprising an injector body, means in said injector body forming a cylindrical bore having an inlet end and an outlet end, means in said injector body forming an inlet port communicating with said inlet end, an outlet port communicating with said outlet end and a two-way transfer port communicating with said cylindrical bore between the inlet and outlet ends thereof, and a piston assembly in said cylindrical bore including a piston movable from a retracted position, at which communication between said inlet port and said two-way transfer port is blocked, to a lubricant displacement position, at which communication between said inlet port and said two-way transfer port is established, and biasing means for biasing said piston from said lubricant displacement position to said retracted position, said distributor system further comprising means forming a lubricant expansion chamber, said two-way transfer ports of each of said injector units except for said last unit being connected to said inlet port of the next succeeding injector unit, said two-way transfer port of said last injector unit being connected to said lubricant expansion chamber.

14. The invention as defined in claim 3 wherein said biasing means comprises a coil spring bottomed at one end on said outlet end of said cylindrical bore and at the other end on said piston.

15. The invention as defined in claim 14 and including means forming an axial rod extending from said piston for limiting the travel of said piston as it moves from said retracted position to said lubricant displacement position such that at the lubricant displacement position thereof said two-way transfer port is substantially completely unblocked.

* * * * *